United States Patent Office 3,460,700
Patented Aug. 12, 1969

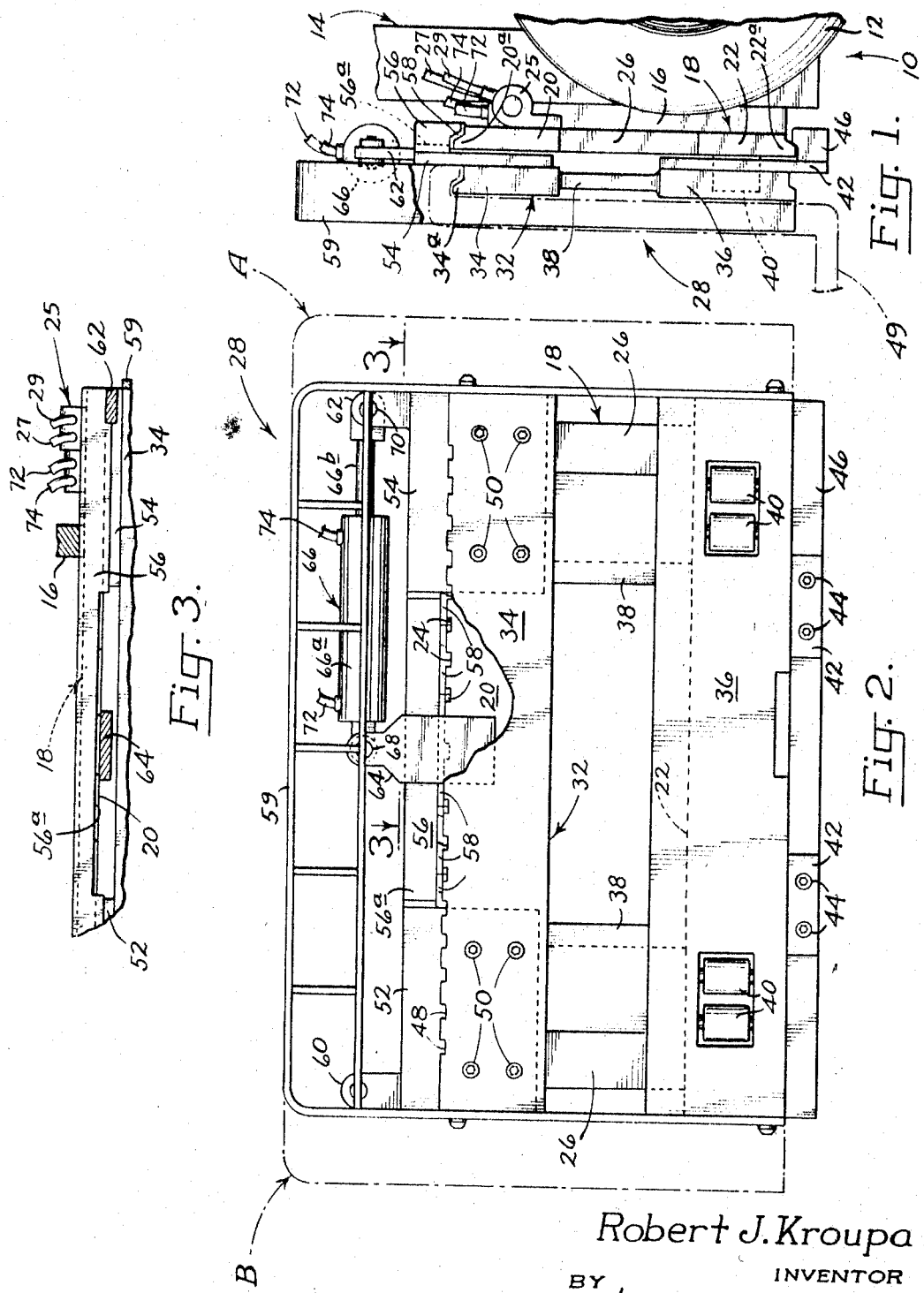

3,460,700
SIDE-SHIFT APPARATUS FOR A LIFT TRUCK
Robert J. Kroupa, Gresham, Oreg., assignor to Cascade Corporation, Portland, Oreg., a corporation of Oregon
Filed Aug. 21, 1967, Ser. No. 662,149
Int. Cl. B66f 9/14
U.S. Cl. 214—730    5 Claims

ABSTRACT OF THE DISCLOSURE

Side-shift apparatus for mounting a load-handling attachment on the carriage of a lift truck, such apparatus in operative position including a side-shiftable frame section disposed in front of the carriage, laterally-spaced mounting parts secured to the back of the frame section, and an elongated hook for the frame section secured to the backs of, and spanning the space between the mounting parts, slidably mounted on the carriage. A stationary motor anchor bracket is mounted on the front face of the carriage in the space between the mounting parts positioned centrally relative to laterally opposite sides of the carriage, and a motor anchor lug is mounted on each of the mount parts, with the bracket and lugs aligned in a direction extending transversely of the lift truck. A hydraulic motor for shifting the frame section is interposed between the bracket on the carriage and one of the lugs on one of the mounting parts.

---

This invention relates to side-shift apparatus for mounting a load-handling attachment on the carriage of a lift truck.

The usual industrial lift truck includes an upright telescopic mast assembly and an elevatable carriage mounted for movement on the mast assembly. Various load-handling attachments, such as lift forks, load clamps, and many others, are available which may be mounted on the carriage to support different types of loads. Very often it is desirable, in a load-handling operation where such a truck is used, and where fairly precise lateral positioning of a load is important, to be able to shift a load laterally to one side or the other of a truck through shifting the means supporting the load on the carriage. A provision for such side-shifting greatly minimizes the amount of truck maneuvering that is required, and thus speeds and simplifies a load-handling operation.

Since side-shift apparatus ordinarily and preferably is made as a removable attachment for a lift truck, and since there are many types of such trucks in use, adaptability to different trucks is an important factor to consider for such apparatus. Also, simplicity and compactness are desirable features for side-shift apparatus. The former helps to reduce maintenance problems. The latter contributes to the utility of a truck in confined spaces.

A general object of the present invention, therefore, is to provide, for use in a lift truck including an elevatable carriage, novel side-shift apparatus through which a load-handling attachment may be mounted on the carriage for lateral movement relative thereto.

Another object of the invention is to provide such apparatus which is readily adaptable for use with different types of lift trucks.

A further object is to provide apparatus of the type generally indicated which permits shifting of a load toward both sides of a truck, yet which is relatively simple and compact in construction.

According to a preferred embodiment of the invention, an attachment is proposed which, in operative position on a truck's carriage, features a side-shiftable frame section disposed in front of the carriage, a pair of laterally-spaced mounting parts fastened to the back of the frame section, and a hook joined to the backs of, and spanning the space between the mounting parts, slidably supported on the carriage. An upright stationary motor anchor bracket is mounted on the front face of the carriage in the space between the mounting parts, and approximately centrally between opposite sides of the carriage. This bracket is positioned behind the frame section and in front of the portion of the hook extending between the mounting parts. In addition, an upright motor anchor lug is provided on each of the mounting parts. The bracket and lugs in the apparatus are aligned in a direction extending transversely of the truck. To shift the frame section, a fluid-operated motor is provided which may be connected between the stationary bracket on the carriage and either of the lugs on the mounting parts.

Because of the novel spaced mounting parts provided for the frame section, several important advantages are obtained. With such construction, the stationary anchor bracket in the apparatus may easily be mounted on the carriage in a position located approximately centrally between opposite sides thereof. This is desirable since it offers an appropriate choice of mounting positions for a motor to accommodate variations in fluid hose locations in different lift trucks. Further, such construction permits the stationary anchor bracket to be mounted on the front face of the carriage without the bracket being in a position where it interferes with side shifting of the frame section. This is important in simplifying the construction of the attachment, and in making it readily adaptable for use in various lift trucks. It provides a construction where, regardless of size differences (particularly thicknesses) between different carriages, the anchor bracket and lugs in the apparatus always line up properly (in a transverse direction relative to a lift truck) to receive a motor. Thus, and contrary to what has often been required in known side-shifters, the anchor bracket and lugs need not be made adjustable.

These and other objects and advantages attained by the invention will become more fully apparent as the description which follows is read in conjunction with the accompanying drawings, wherein:

FIG. 1 is a fragmentary side elevation illustrating the front part of a lift truck with a side-shift attachment constructed according to the invention mounted on a carriage in the truck;

FIG. 2 is a front view of the side-shift attachment in FIG. 1; and

FIG. 3 is a fragmentary cross-sectional view taken along the line 3—3 in FIG. 2.

Turning now to the drawings, and referring particularly to FIGS. 1 and 2, indicated generally at 10 is the front part of an industrial lift truck which includes the usual front wheel assemblies, such as wheel assembly 12, and an upright, sectional, telescopic mast structure 14. Mounted for vertical movement on the mast structure through mounting bars, such as bar 16, is an upright carriage 18. The carriage includes upper and lower, elongated, vertically-spaced members 20, 22, respectively, which are substantially horizontal and which extend transversely of truck 10. As can be seen particularly in FIG. 1, extending along the upper edge of member 20 is an upwardly projecting flange 20a, and along the lower edge of member 22 is a downwardly projecting flange 22a. Referring to FIG. 2, flange 20a is provided with plural notches, such as notches 24, spaced along its length. Adjacent their opposite sets of ends, members 20, 22 are joined by a pair of upright members 26.

In truck 10, pressure fluid for operating apparatus mounted on carriage 18 is made available through a hose coupling device 25 which is mounted on the back of member 20 adjacent the right side of the carriage as the same is viewed from the front. Hoses 27, 29 connect device 25 to a suitable source of pressure fluid provided in the truck.

Mounted on carriage 18, and indicated generally at 28, is side-shift apparatus taking the form of an attachment constructed according to the invention. Forming part of this apparatus, and illustrated at 32 is an upright frame section, constituting a side-shiftable frame section or frame herein, which is disposed in front of carriage 18. The frame section includes upper and lower, elongated, vertically-spaced members 34, 36 which substantially parallel members 20, 22 in the carriage. Members 34, 36 are joined together adjacent their opposite sets of ends by a pair of laterally-spaced upright members 38.

Suitably mounted adjacent opposite ends of lower member 36 in the frame section are pairs of rollers 40 which engage the front face of member 22 in the carriage. These rollers provide rolling contact for the lower part of the frame section on the carriage to accommodate relative lateral movement therebetween. Mounted on the back of member 36 are a pair of laterally-spaced plates 42 which extend somewhat below the member. Joined to the back faces of plates 42, by means of fasteners 44, is an elongated horizontal bar, grooved along the top, referred to commonly as a hook 46. As can be seen clearly in FIG. 1, the hook is shaped to engage flange 22a of member 22 in the carriage, and the hook functions while engaging the flange to prevent the bottom part of frame section 32 from moving forwardly away from the carriage.

As will be apparent from viewing FIGS. 1 and 2, member 34 in the frame section is substantially the same in construction as member 20 in the carriage. Thus, it includes a flange 34a and notches 48 which correspond to flange 20a and notches 24, respectively. Flange 34a and notches 48 facilitate mounting of a load-handling attachment, such as lift fork 49, on the frame section.

Joined to the back of member 34 adjacent opposite ends of the member, by means of fasteners 50, are a pair of laterally-spaced plates, or mounting parts, 52, 54 for the frame section. Joined to the back faces of, and spanning the space between, plates 52, 54 is an elongated bar 56, also referred to as a hook, which is similar to previously-described hook 46. Considering for a moment FIG. 3, the portion of hook 56 which extends between plates 52, 54 is dished in slightly along the front thereof, as at 56a. Such dished-in area, or recess, provides clearance in the space existing between parts 52, 54.

According to the invention, hook 56 supports the frame section in the apparatus for lateral shifting relative to carriage 18. Thus, the hook is slidably supported on the carriage through plural shoes, such as shoes 58 (FIGS. 1 and 2), which are seated on top of member 20 in the carriage. Shoes 58 (fitted in the notches described) are distributed along the length of the member. As can be seen clearly in FIG. 1, hook 56, in cross-sectional outline, is shaped to engage flange 20a, and the hook further functions in the apparatus to prevent the upper part of the frame section from moving forwardly away from the carriage.

Extending over the top and along the sides of frame section 32 is lattice work 59 which is joined to members 34, 36 in the frame section. The lattice work provides back-up support for a load.

Considering FIG. 2, suitably mounted on top of plate 52 adjacent the left side thereof in the figure is an upright motor anchor lug 60. A similar lug 62 is mounted on top of plate 54 adjacent the right side of the plate in FIG. 2. The upper end portions of lugs 60, 62 extend above carriage 18 and hook 56. Suitably joined to the front face of member 20 in the carriage, in the space between plates 52, 54, and approximately centrally between opposite sides of the carriage, is an upright motor anchor bracket 64, also referred to herein as a stationary bracket. As can be seen in FIGS. 2 and 3, bracket 64 is situated behind member 34 in the frame section (in the space provided between the rear of the frame section and the front of the carriage), and also in front of bar 56 (in the space provided by recess 56a). The upper end portions of lugs 60, 62, and that of bracket 64 are all aligned in a direction extending transversely of the longitudinal axis of the lift truck, in a region located forwardly of the front face of carriage 18.

Means for shifting the frame section toward one side or the other of carriage 18 herein comprises a hydraulic motor 66. Motor 66 is shown with its cylinder end 66a pivotally connected at 68 to bracket 64, and its rod end 66b pivotally connected at 70 to lug 62. Motor 66 is shown in FIG. 2 in a condition extended approximately halfway, and in this condition, the motor has a length which is substantially half the distance between lugs 60, 62. Pressure fluid is supplied to opposite ends of the cylinder in the motor through hoses 72, 74 which are connected to previously-mentioned device 25 on the carriage.

Considering FIG. 2, frame section 32 is illustrated in solid outline in a position where it is centered relative to opposite sides of carriage 18. With the frame section in this position, it will be noted that anchor bracket 64 is substantially centered between plates 52, 54 with a space provided between each of the plates and the bracket. This organization permits the frame section to shift laterally a considerable distance toward each side of the carriage. To shift the frame section to the right in the figure, for example to position A, pressure fluid is supplied to extend motor 66. Similarly, to shift the frame section to the left in the figure, for example to position B, pressure fluid is supplied to contract motor 66.

It should be noted that while motor 66 is shown herein connected between bracket 64 and 62, this has been done to accommodate connections with coupling 25 and hoses 27, 29 which are provided on the right side of the truck as viewed from the front. Had the coupling and hoses been provided on the other side of the truck, motor 66 would be connected between bracket 64 and lug 60 to accommodate connections. Thus, the novel anchor lugs provided herein and the central positioning of bracket 64 on the carriage provide a choice of mounting positions for motor 66, and accordingly contribute to the overall versatility of the apparatus and to its adaptability for use with different lift trucks.

By including spaced-apart mounting plates 52, 54 located adjacent opposite sides of the frame section, and the dished-in region in bar 56, a clearance space is present permitting the mounting of anchor bracket 64 on the front of the carriage with the same thence extending upwardly to an upper end which is front of bar 56, and with the bracket so positioned being aligned in a transverse direction with the anchor lugs which are secured to the frame section. This organization permits the mounting of a ram or extensible motor with the same interposed between anchor bracket 64 and one of the anchor lugs located on the frame section, with such motor occupying a position extending normal to the axis of the lift truck without the inclusion of fittings or other structure to position properly the ends of the motor. In addition, the organization accommodates mounting of the motor in a readily accessible region above carriage 18 and hook 56.

This is to be compared with certain known forms of construction where the anchoring for one end of the motor which produces side shifting is through a bracket which projects upwardly from the back side of the carriage. With such back side positioning, and with the bracket which mounts the other end of the motor located forwardly of the carriage back side, the motor must either extend at an oblique angle relative to the longitudinal axis of the truck, which is undesirable since this angle must change with extension of the motor and shifting of the frame section, or one of the anchor brackets must be modified (to an extent dependent upon the width of the carriage) to provide an anchoring point which is properly transversely in line with the other anchor bracket. Lattice work 59 forms a shield in front of motor 66, and prevents the motor from being bumped by a load carried in front of frame 32.

While an embodiment of the invention has been described herein, it is appreciated that variations and modifications may be made without departing from the spirit of the invention.

It is claimed and desired to secure by Letters Patent:

1. In a lift truck including an upright elevatable carriage, an attachment for mounting on the carriage comprising
   a side-shiftable frame adapted to be mounted in a position disposed in front of said carriage, said frame including a back which, with the frame in operative position, faces the carriage,
   a pair of upright plates secured to the back of said frame with one adjacent one side and the other adjacent the other side of the frame, said plates defining a void space between them,
   hook means joined to and extending rearwardly of said plates adapted to support the frame for lateral movement on the carriage,
   a motor anchor bracket adapted to be secured to said carriage at a point located centrally between laterally opposite sides thereof, with such bracket when so secured occupying a position disposed within said void space, and including an upper end portion projecting above the carriage and said hook means,
   a pair of motor anchor lugs joined to opposite sides of said side-shiftable frame, said lugs including upper end portions that are in transverse alignment and are aligned with said upper end portion of said bracket with the attachment in operative position on a lift truck carriage,
   and an elongated power-operated extensible-contractible motor for producing side movement of said side-shiftable frame including opposite ends accommodating mounting of the motor, and having a length between said ends when extended substantially halfway which is substantially half the distance between said motor anchor lugs, said motor being adapted to extend from said centrally located anchor bracket to either of said anchor lugs to establish an operative mounting of the attachment on a lift truck carriage.

2. The apparatus of claim 1 which further comprises an upright shield mounted on said frame above said hook means and extending along the front side of said motor with the attachment mounted in operative position on a lift truck carriage.

3. In combination with a lift truck including an upright elevatable carriage, an attachment comprising
   a side-shiftable frame disposed in front of said carriage,
   a pair of upright plates secured to the back of said frame with one adjacent one side and the other adjacent the other side of the frame, said plates defining a void space between them,
   an elongated hook joined to and extending rearwardly of said plates including a midregion spanning the space between said plates, said hook being supported for lateral movement on said carriage,
   a motor anchor bracket disposed within said void space and forwardly of said midregion of said hook, and secured to said carriage at a point located centrally between laterally opposite sides thereof, said bracket having an upper end portion projecting above the carriage and hook,
   a motor anchor lug joined to one side of said frame having an upper end portion in transverse alignment with said upper end portion of said bracket,
   and a power-operated extensible-contractible motor operatively interposed between said end portions.

4. The apparatus of claim 3 which further comprises an upright shield mounted on said frame above said hook and extending along the front side of said motor.

5. The apparatus of claim 3, wherein said motor anchor bracket is mounted on and lies against the front face of said carriage.

References Cited

FOREIGN PATENTS 930,077   7/1963   Great Britain.

GERALD M. FORLENZA, Primary Examiner

RAYMOND B. JOHNSON, Assistant Examiner